United States Patent [19]

Kunz

[11] Patent Number: 5,353,340
[45] Date of Patent: Oct. 4, 1994

[54] DYNAMIC ALLOCATION OF ROAMER ROUTING NUMBERS SYSTEM AND METHOD

[75] Inventor: David P. Kunz, Montreal, Canada

[73] Assignee: Telefonaktiebolaget L M Ericsson, Stockholm, Sweden

[21] Appl. No.: 900,457

[22] Filed: Jun. 18, 1992

Related U.S. Application Data

[63] Continuation of Ser. No. 490,480, Mar. 8, 1990, abandoned.

[51] Int. Cl.⁵ .................................. H04M 11/00
[52] U.S. Cl. ............................... 379/60; 379/59; 455/33.1
[58] Field of Search ............................. 379/58–60; 455/33.1, 33.2, 34.1

[56] References Cited

U.S. PATENT DOCUMENTS

| | | | |
|---|---|---|---|
| 4,228,319 | 10/1980 | DeJager et al. | 379/60 |
| 4,646,345 | 2/1987 | Zdunek et al. | 379/62 |
| 4,658,416 | 4/1987 | Tanaka | 379/57 |
| 4,748,655 | 5/1988 | Thrower et al. | 379/60 |
| 4,794,635 | 12/1988 | Hess | 379/63 |
| 4,833,701 | 5/1989 | Comroe et al. | 455/33.2 |
| 4,833,702 | 5/1989 | Shitara et al. | 379/60 |
| 4,901,340 | 2/1990 | Parker et al. | 379/60 |
| 5,090,050 | 2/1992 | Heffernan | 379/58 |
| 5,093,926 | 3/1992 | Sasuta | 455/34.1 |

OTHER PUBLICATIONS

EIA/TIA IS–41. 3–A Standards "Cellular Radio Telecommunications, Intersystem Operations: Automatic Roaming", Feb. 1990.

"Cellular Networking: The Building of the Nationwide Cellular Network", *Cellular Business*, Duane Huff, Aug. 1988.

"Proposal: Straw Man for Automatic Roaming Electronic Industries Association TR–45.2 Cellular System Operation, Working Group II", Jun. 18, 1985.

"Routing of Call to Mobile Subscriber Automatic Roaming" an Ericsson Communications, Inc. document, Mar. 25, 1987.

Recommendation T/S 43-10, CCITT Signalling System No. 7 Mobile Application Part (MAP), Recommendation Proposed by Working Group T/No 11, "Signalling Protocols and Switching" (SPS), pp. 184–185.

ETSI/TC GSM, "Recommendation GSM 09.02 Mobile Application Part Specification", pp. 161–162, Jan. 1991.

ETSI/TC GSM, "Recommendation GSM 03.03 Numbering, Addressing and Identification", pp. 7 and 8, Feb. 9, 1990.

ETSI/TC GSM, "Recommendation GSM 03.08 Organization of Subscriber Data", pp. 5 and 6, Jan. 1991.

World Publication, WO 9105429, Ablay et al., Apr. 1991.

*Primary Examiner*—Curtis Kuntz
*Assistant Examiner*—Dwayne D. Bost
*Attorney, Agent, or Firm*—Johnson & Wortley

[57] ABSTRACT

The present invention provides a communications system including at least one mobile transceiver; at least one mobile switching center, at least one mobile switching center including means for allocating a temporary routing number for at least one mobile transceiver to facilitate call set-up; and means for releasing the temporary routing number to make it available for reuse. The present invention also provides a mobile services switching center or exchange for establishing communications with at least one mobile subscriber, this exchange including means for allocating a temporary routing number for at least one mobile subscriber to facilitate call set-up and means for releasing the temporary routing number to make it available for reuse. Still further, the present invention provides a method employed by both the system and the exchange described above.

28 Claims, 5 Drawing Sheets

DYNAMIC ALLOCATION OF ROAMER ROUTING NUMBERS SYSTEM AND METHOD

This is a continuation, of application Ser. No. 490,480, filed Mar. 8, 1990, now abandoned.

BACKGROUND OF THE INVENTION

1. Field of the Invention

The present invention relates to communications systems having mobile subscribers. More particularly, the present invention relates to a method of routing calls to such mobile subscribers under certain circumstances.

2. Description of Related Art

In certain communication systems, such as in some radiotelephone systems, the whole service area of the systems are divided into a plurality of local service areas. In each local area, radio access units are located at one or more key points to establish radio links between mobile subscribers and mobile switching centers. Mobile subscribers are permanently assigned unique telephone numbers recognized by the public switched network and they are also temporarily assigned a different number whenever they roam into another local area. Assignment of such a temporary subscriber number requires that the system be provided with information on the current location of each mobile subscriber. Each of the mobile subscribers of the system must therefore be registered exclusively in one of the local areas. To maintain this exclusivity, whenever a mobile subscriber moves to another local area, the old registration must be cancelled in the area departed and a new registration made in the area in which the mobile subscriber just arrived.

Heretofore, whenever a subscriber with automatic roaming capabilities was first detected in a cooperating exchange, the subscriber was immediately registered as an automatic visitor within the exchange. Upon registration, the subscriber was allocated a subscriber number. This number was employed to assist an interrogation exchange or the visitor's home exchange in routing a call to the subscriber.

If all calls were only routed within a cooperating exchange network, the numbers could be assigned by the exchange itself. However, these numbers would not be recognized by other systems (i.e., the Public Switched Telephone Network). To accommodate calls that require routing outside the cooperating network, subscriber numbers often have to be leased from an outside source.

It should also be recognized that heretofore, the subscriber numbers allocated at connection of the automatic visitor have not been released until the visitor has disconnected. As a result, it has been necessary to have as many subscriber numbers as there are registered automatic visitors. This has been to ensure that each registered automatic visitor has the capability of receiving a call. Needless to say, however, leasing subscriber numbers from an outside source can be expensive. As prior art systems have uniformly required at least one leased number per registered automatic visitor, these prior art systems have all been implemented at relatively high cost. Based upon these facts, it is clear that lacking a method of reducing the number of leased subscriber numbers in prior art communication systems is a deficiency and shortcoming of the prior art.

Although there are no known prior art teachings of a solution to the aforementioned deficiency and shortcoming such as that disclosed and claimed herein, a number of prior art references exist that discuss subject matter that bears some relation to matters discussed herein. Such prior art references are U.S. Pat. Nos. 4,228,319, 4,612,415, 4,748,655, 4,794,635, 4,833,701 and 4,833,702. Each of these references is discussed briefly below.

U.S. Pat. No. 4,228,319 to De Jager et al. relates to an automatic mobile subscriber system. De Jager et al. teach stationary stations which repeatedly transmit through their cell channel a channel number of a free duplex speech channel which is stored in a storage device in mobile stations receiving the call channel. De Jager et al. also teach use of the stored channel number for automatically selecting the free duplex speech channel in response to a connection set-up command.

U.S. Pat. No. 4,612,415 to Zdunek et al. relates to a method and means for controlling telephone interconnect traffic in a trunked radio system. Zdunek et al. teach continuously monitoring all types of communication traffic on the system and, in response to an increasing dispatch access delay, reserving certain repeaters for dispatch use only during a predetermined period. Zdunek et al. also teach a system in which the number of simultaneous telephone interconnect calls permitted on the system during the predetermined period is dynamically altered in response to system loading. Still further, Zdunek et al. teach establishment of a variable, periodically updated, maximum interconnect call length based on the current system dispatch access delay.

U.S. Pat. No. 4,748,665 to Thrower et al. relates to portable telephones. According to the teachings of Thrower et al., a personal portable telephone allows a user access to a cellular radio network via a number of different gateways including a communal unit, user's mobile telephone set, home telephone or office PABX. The telephone can also be used as a paging unit for use within the cellular radio network. The communal radio unit is a multi-channel arrangement capable of servicing a large number of personal telephones within its service area which is small compared to that of a normal cellular radio cell. The communal units may be transportable and located in public areas such as railway stations, airports and on trains or coaches. The telephone automatically transmits its identification number to a gateway when it enters its service area enabling the subscriber to be accessed by callers without their knowing his whereabouts.

U.S. Pat. No. 4,794,635 to Hess teaches a two-way radio communication system having a limited number of channels which assigns calls in a max-minimum method. Hess's method also ascertains the type of call, handoff or first assignment, and assigns a server with a given central controller to a channel frequency within the requestor sector that minimizes interference to present users. In a second embodiment of his method, Hess teaches requesting assignment to a limited number of channels to reduce adjacent channel interference to and from the requestor with respect to present users operating on a system by utilizing one or more thresholds to arrange channel assignments based upon progressively larger or smaller values of received signal strength.

U.S. Pat. No. 4,833,701 to Comroe et al. relates to a trunked communications system with nationwide roaming capability. According to the teachings of Comroe et al., selected regional trunking systems are equipped with telephone interchange capability and provided with local computers, which communicate with a national hub computer. At each selected trunking system, several ID's are reserved as "roaming ID's" to be temporarily assigned to roaming subscribers. When a subscriber determines that he has roamed into a new trunk system, he requests a roaming ID. A roaming ID is assigned and transmitted to the subscriber, which thereafter operates within the new trunked system using its roaming ID. The roaming assignment is also transmitted to the national hub computer so that interconnect calls may be properly forwarded. This differs from the present invention, wherein a roaming number assignment is requested at each call attempt rather than transmitted to the national hub computer. Referring again to Comroe et al.'s teachings, the roaming subscriber continues to operate under the assigned roaming ID until it roams out of range of the current system and into yet another trunked system. In this way, the subscriber may roam from system to system.

U.S. Pat. No. 4,833,702 to Shitara et al. relates to telephone registration and cancellation control in a wide area cordless telephone system. Specifically, Shitara et al. teach a method for making a registration of a roaming cordless telephone in one of a plurality of local service areas and cancelling the registration.

Review of each of the foregoing patents reveals no disclosure or suggestion of a system or method such as that described and claimed herein.

SUMMARY OF THE INVENTION

To overcome the deficiencies and shortcomings of the prior art discussed above, the present invention provides a communications system including at least one mobile transceiver and at least one visited mobile switching center or MSC. According to the teachings of the present invention, the at least one visited MSC includes means for allocating a temporary routing number for the at least one mobile transceiver to facilitate call set-up, and means for releasing the temporary routing number to make it available for reuse. In embodiments of the present invention, the at least one mobile transceiver may be at least one mobile subscriber.

Also, according to the teachings of the present invention, the means for allocating a temporary routing number for the at least one mobile subscriber to facilitate call set-up may be a means for allocating a temporary routing number for the at least one mobile subscriber to facilitate incoming call set-up. Additionally, the means for releasing the temporary routing number to make it available for reuse may be a means for releasing the temporary routing number to make it available for reuse after the incoming call set up.

The present invention also provides a visited NSC for establishing communications with at least one mobile subscriber. In embodiments of the mobile switching center or exchange of the present invention, the means for allocating a temporary routing number for the at least one mobile subscriber to facilitate call set-up may be an optionally selectable means for allocating a temporary routing number for the at least one mobile subscriber to facilitate call set-up. In such an embodiment, the means for releasing the temporary routing number to make it available for reuse may be an optionally selectable means for releasing the temporary routing number to make it available for reuse.

The present invention also provides a method of routing a call to at least one mobile subscriber in a communications system including at least two MSC's. The method according to the teachings of the present invention includes the steps of allocating a temporary routing number to the at least one mobile subscriber to facilitate call set-up, and releasing the allocated temporary routing number for reuse after call set-up.

Accordingly, it is an object of the present invention to efficiently route incoming calls to roaming subscribers in a communications system.

Another object of the present invention is to economically dynamically allocate roamer routing numbers in a communications system.

BRIEF DESCRIPTION OF THE DRAWINGS

For a more complete understanding of the present invention, and the further objects and advantages thereof, reference may now be had to the accompanying description taken in conjunction with the accompanying drawings in which.

DETAILED DESCRIPTION OF THE DRAWINGS

Figure 1:
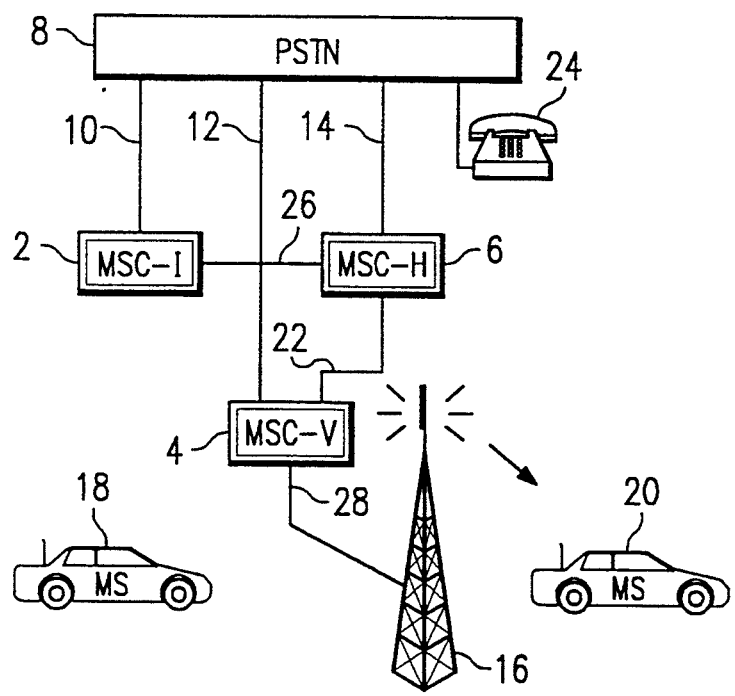
FIG. 1 is a block diagram of a mobile subscriber system according to the teachings of the present invention.

Referring now to FIG. 1, a cellular radio network according to the teachings of the present invention is shown therein. This network may be seen to comprise a plurality of mobile services switching centers (MSC's) 2, 4, 6 linked to the public switched telephone network (PSTN) 8. Each MSC 2, 4, 6 is shown to be directly connected (via links 10, 12, 14) to the PSTN 8.

Figure 2:
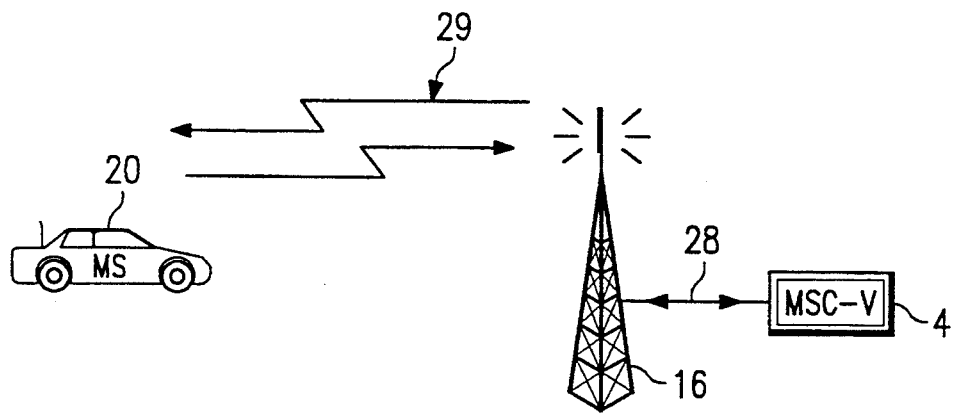
FIG. 2 is a more detailed block diagram of a portion of FIG. 1.

Associated with each MSC is a base station, such as base station 16 shown associated with MSC-V in FIG. 1. The "V" designation of MSC 4, as well as the "I" and "H" designations of MSC's 2 and 6 respectively, will be explained below. Via base stations such as base station 16, radio links may be established between the various MSC's and mobile subscribers (MS's), such as MS's 18 and 20 shown in FIG. 1. Such a radio connection, generally designated by reference numeral 29, is more explicitly shown in FIG. 2. It may be seen therein that radio communications may be transmitted between a MS 20 and a base station 16 associated with a MSC-V 4.

Each MS has a phone set with a uniquely assigned MS phone number. Likewise, each MS has a home exchange, designated MSC-H. Referring again to FIG. 1, it may be considered that MSC-H 6 is the home exchange of MS 20. Routing of calls to MS 20 may be undertaken solely by MSC-H 6 as long as MS 20 remains in the area serviced by MSC-H 6.

However, quite frequently, mobile subscribers such as MS 20 travel outside of the coverage area of its MSC-H and into the area of another MSC, designated a visited exchange, or MSC-V, e.g. MSC-V 4 shown in FIG. 1. Needless to say, during such "roaming", it is very important to efficiently and correctly keep track of the MS's location. Various registration procedures have been established to help accomplish this. These registration procedures involve transmitting the MS number of the phone set to the base station 16 servicing the MSC-V 4. Effectively, the base station 16 serves to relay data between a visiting MS 20 and the visited MSC 4. At that point, the MSC-V 4 attempts to identify the MS 20 by analyzing the relayed phone set number. Assuming the MSC-V 4 determines that the MS 20 is a visitor from a cooperating MSC, e.g. MSC-H 6, the MSC-V 4 provides service to the visitor by allocating a subscriber number for it. Then, via communication link 22, the visiting MS's MSC-H 6 is notified of the visitor's location in the network, that is, in the coverage area of MSC-V 4.

Continuing to refer to FIG. 1, the procedures according to the teachings of the present invention for routing a call to the visitor (MS 20) may now be considered. Such a call can be placed by an "ordinary" PSTN subscriber, designated by the telephone symbol 24, to MS 20 while visiting MSC-V 4. In such a case, once the digits dialed by subscriber 24 are received by the PSTN 8, the PSTN 8 routes the call to a MSC exchange designated as an entry into the overall cellular or Mobile Telephone Network. For purposes of discussion, this exchange is designated by reference numeral 2 in FIG. 1. Such a designated exchange is known to those skilled in the art as an interrogating exchange (MSC-I).

The MSC-I 2 analyzes the dialed digits relayed to it by the PSTN 8 and generates destination data for a roaming signalling message sent to the same MSC, that is, MSC-H 6, of the called MS 20. This is provided that MSC-I does not identify the subscriber through the dialed number as its own. For the purpose of this explanation, it is assumed this is not the case. This message, which is of the form "the routing inquiry message", requests information on how the call shall be routed to the MS 20. In FIG. 1, this "the routing inquiry message" should be understood to be sent from the MSC-I 2 to the MSC-H 6 via communication link 26.

Upon receiving the "routing inquiry message" from the MSC-I 2, the MSC-H 6 identifies the subscriber through the dialed number as its own, and determines that the MS has travelled into the coverage area of another MSC, MSC-V 4.

At this point, in order to route the call to the MSC-V 4, a roaming number is needed. Destination data is obtained for a roaming signalling message to be sent to the visited MSC-V 4. This message, "the roaming number interrogation message", is sent to the MSC-V 4. "The roaming number interrogation message" contains the MS number of the called visitor 20. It should be recognized at this point that the dialed subscriber numbers cannot be used because those numbers are not stored in the MSC-V 4 and would not, therefore, be recognized.

Once the MSC-V 4 receives the message, a roamer routing number is allocated and the MS number is stored within its record. The roamer routing number is then returned as the roaming number to the MSC-H 6. The MSC-H 6 then forwards the number to the MSC-I 2. The foregoing transfers between the various MSC's are all accomplished via roaming signalling messages and inter-MSC communication links 22 and 26.

The MSC-I 2 analyzes the roamer routing number and, as a result, returns the call to the PSTN 8. The PSTN 8 then analyzes the roamer routing number, the result of which analysis is routing of the call directly from the PSTN 8 to the MSC-V 4 via communication link 12.

Once the incoming call is received by the MSC-V 4, analysis of the roamer routing number leading to the previously stored MS number can be undertaken. At that point, according to the teachings of the present invention, the roamer routing number is then released so as to be available for use in routing of other calls. At that point, the MS number can be used to determine the subscriber number allocated to the visitor 20. Analysis of this subscriber number results in paging of the MS 20 via the MS number through the base station 16 and link 28 between the MSC-V 4 and the base station 16 and radio link 30 between the base station 16 and the MS 20.

Figure 3:
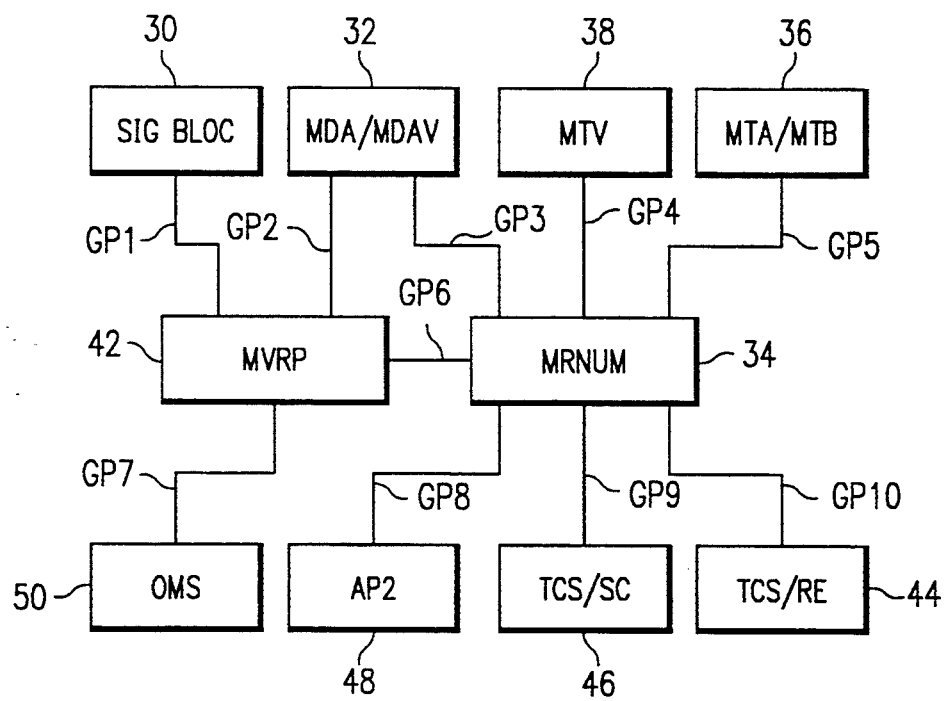
FIG. 3 is a block diagram of a mobile switching center according to the teachings of the present invention.

Now, for an even more complete understanding of aspects of the present invention, especially with regard to an exchange or MSC constructed and/or configured to implement the present invention, it is helpful to recognize all blocks in an exchange that could be employed in such an embodiment of the present invention before discussing that embodiment in detail. Such blocks are depicted in FIG. 3. Those persons skilled in the art should recognize each of these blocks generally, and should also be aware of and understand other blocks that may be found in typical exchanges. Those skilled in the art should also know the interrelationships in structure and operation among all the blocks, whether or not shown. However, for the purpose of fully understanding one embodiment of the present invention, noteworthy details regarding the blocks shown in FIG. 3 are set forth immediately below.

Referring to FIG. 3, reference numeral 30 depicts the Mobile Telephone Signalling block (SIGBLOC). This block handles signalling messages for inter-MSC communication.

The MDA/MDAV (Mobile Telephone Digit Analyzed/Mobile Telephone Digit Analysis for Visitors) blocks, designated by reference numeral 32, execute the mobile subscriber number analysis. More specifically, the MDAV block analyzes the mobile subscriber number for visitors.

The MRNUM block 34, that is, the Mobile Telephone Roamer Routing Number block, handles the selection of roamer routing number for call setup to a cooperating exchange during automatic roaming.

The Mobile Telephone A-Subscriber (MTA) block 36, performs traffic handling functions for originating calls. The MTA block 36 has a controlling function for each call and constitutes the interface towards other subsystems. The MTB block, that is, the Mobile Telephone B-Subscriber block, also designated by reference numeral 36, performs traffic handling functions for terminating calls.

The MTV block, that is, the Mobile Telephone Visiting Subscriber, Automatic Roaming block, designated by reference numeral 38, handles subscriber data allocated within mobile telephone system for visitors belonging to a cooperating exchange during automatic roaming.

Continuing to refer to FIG. 3, reference numeral 42 designates the mobile telephone visitor routing data provision (MVRP) block, which block contains functions for determining roamer routing numbers for visiting mobile subscribers upon request from the subscriber's home exchange.

Reference numerals 44 and 46 designate a subsystem register function and subscriber category, respectively. The register function block 44 stores the incoming digits and handles the set-up of calls. The subscriber category block 46 stores subscriber categories for all subscribers connected to the exchange.

To assist those skilled in the art in fully understanding the operation of the blocks discussed immediately above, as well as other blocks, shown and not shown, set forth immediately below are descriptions of signals that are routed between the blocks as shown in FIG. 3. With reference to FIG. 3, group 1 signal may be seen to pass between blocks 30 and 42, group 2 signals between blocks 32 and 42, and so on. Understanding what happens in the various blocks, as described above, and further understanding the type of information that passes between the blocks as indicated below, those skilled in the art should fully understand operation of an exchange configured according to the teachings of the present invention.

| SIGNALS | | | |
|---|---|---|---|
| | Description | Sender | Receiver |
| Group 1 | | | |
| MRIMI | Roaming number interrogation, incoming message | SIGBLOC | MVRP |
| MNRMO | Roaming number, outgoing message | MVRP | SIGBLOC |
| MRNRO | Roaming number rejected, outgoing message | MVRP | SIGBLOC |
| Group 2 | | | |
| IDENTMS | Identify mobile suscriber | MVRP | MDA/MDAV |
| MSIDENT | Mobile subscriber identified | MDA/MDAV | MVRP |
| MSNOIDENT | Mobile subscriber not identified | MDA/MDAV | MVRP |
| Group 3 | | | |
| FINDMS | Find subscriber data for mobile station number (MSNB) | MRNUM | MDA/MDAV |
| MSFOUND | Subscriber data for MSNB found | MDA/MDAV | MRNUM |
| MSNOFOUND | Subscriber data for MSNB not found | MDA/MDAV | MRNUM |
| Group 4 | | | |
| FETCHMSDATA | Fetch mobile suscriber data | MRNUM | MTV |
| FETCHMSDATAR | Result of fetching a mobile suscriber data | MTV | MRNUM |
| GETVSUBINFO | Fetch the suscriber information for the call set up from the visiting subscriber block | MRNUM | MTV |
| GETVSUBINFOR | Result of fetching visiting subscriber information for call set up | MTV | MRNUM |
| OFSEIZE | Read the linked MTA/MTV reference and connection status | MRNUM | MTV |
| OFSEIZERD | Linked MTA/MTB reference and and connection status returned | MTV | MRNUM |
| Group 5 | | | |
| GETMSDATA | Read mobile subscriber data | MRNUM | MTA/MTB |
| GETMSDATAR | Result of reading of mobile subscriber data | MTA/MTB | MRNUM |
| Group 6 | | | |
| FETCHRNB | Order selection of roaming number | MVRP | MRNUM |
| FETCHRNBR | Result of selection of roaming number | MRNUM | MVRP |
| Group 7 | | | |
| CAPCONG | Insufficient processor capacity | OMS | MVRP |
| CAPSEIZED | Processor capacity seized | OMS | MVRP |
| SEIZECAPT | Request processor capacity | MVRP | OMS |
| Group 8 | | | |
| FAULT | Information on fault situation | MRNUM | APZ |
| COFAULT | Information on end of alarm situation | MRNUM | APZ |
| REFO | Transfer of fault parameters to print unit | APZ | MRNUM |
| REFOACK | Acknowledge signal to signal REFO | MRNUM | APZ |
| Group 9 | | | |
| TRSCIND | Order translation of SC-pointer into a suscriber number | MRNUM | TCS/SC |
| TRSCINDR | Suscriber number returned | TCS/SC | MRNUM |
| Group 10 | | | |
| CALL | Digits ready for transmission | TCS/RE | MRNUM |
| OBNR | Available digits | TCS/RE | MRNUM |
| OCODE | End of selection code | MRNUM | TCS/RE |
| OCONG | Congestion at selection of an | MRNUM | TCS/RE |

| | SIGNALS | | |
|---|---|---|---|
| | Description | Sender | Receiver |
| | outgoing individual | | |
| ODISC | Release outgoing individual from RE | TCS/RE | MRNUM |
| ODISCED | Outgoing junction released from RE | MRNUM | TCS/RE |
| OFBNR | Rerouting, Restart B-number analysis | MRNUM | TCS/RE |
| OGRA(4) | Request available B-number digits | MRNUM | TCS/RE |
| OGR1 | B-number digit | TCS/RE | MRNUM |
| ORG4 | Transmission of B-number completed | TCS/RE | MRNUM |
| ONEXTBD | Request next available B-number digit | MRNUM | TCS/RE |
| OSEIZED | Outgoing individual selected | MRNUM | TCS/RE |
| SEIZEOLINK | Select an outgoing individual | TCS/RE | MRNUM |
| STOREMTSDATA | Store RE-information, MTS specific | MRNUM | TCS/RE |

Based on the foregoing, it should be understood that according to the teachings of the present invention, roaming number interrogations are routed from the home mobile telephone exchange to the visited mobile telephone exchange. The mobile station number is sent in the roaming number interrogation.

Depending upon whether or not the dynamic allocation of roamer routing numbers system according to the present invention is activated, the roaming number can be either read from the SC block 46 in the form of the visitor's subscriber number or selected among the available roaming routing numbers (RRNB's). This number can be sent in the routing message to the home exchange.

In the event dynamic allocation of roamer routing numbers has been activated, time supervision is initiated for the delivery of the call, i.e., the routing of the call back to the visited exchange. After a successful seizure by the RE block 44, the block MRNUM 34 receives the roamer routing number digits. Upon reception of all, e.g., ten, RRNB digits, a pointer to the RRNB record is calculated, using the internal route pointer, received in the signal SEIZEOLINK, and the last two RRNB digits received from the RE block 44. The pointed RRNB record contains the associated mobile station number (MSNB). The roamer routing number may then be freed so that it can be used for other call attempts. After a successful translation of the MSNB into an MTV pointer, the SC-pointer is obtained, providing the visitor's subscriber number. The subscriber number (SNB) is passed to the RE block 44 in order to allow restart of the B-number analysis.

With regard to reception of roaming number interrogation, the signalling block SIGBLOC 30 receives the roaming number interrogation from the home exchange and directs the request to the function block MVRP 42. This is via the MRIMI signal. The identification of the mobile subscriber follows after successful seizure of the MVRP task individual and after the check for sufficient central processor capability has been successfully completed. Otherwise, a roaming number rejected message (that is, a MRNRO signal) can be sent to the roaming signalling block SIGBLOC 30.

With regard to identification of the mobile subscriber, the block MVRP 42 orders the analysis and connection of the received mobile station number (MSNB) in blocks MDA/MDAV 32, by sending signal IDENTMS to the MDA block 32. Within the MDA block 32, the MVRP block 32 causes analysis of the visitor's MSNB and, if necessary, the connection or seizure of the visitor subscriber data record by sending the signal IDENTVMS to the MDAV block 32. In the event of an unsuccessful MSNB analysis or connection, the signal MSNOIDENT is received from the MDA/MDAV block 32, resulting in the roaming number rejection message, that is, the signal MRNRO sent to the SIGBLOC block 30. Otherwise, the MSIDENT is received from the MDA/MDAV block 32 as an acknowledgment of successful analysis and connection and, if a subscriber type is correct, roaming number determination takes place. If the subscriber is not a visitor, the roaming number rejected message is returned via a MRNRO signal to the signalling block SIGBLOC 30.

With regard to roaming number determination, the MVRP block 42 orders the selection of the roaming number in block MRNUM 34 by sending the signal FETCHRNB. The return signal FETCHRNBR is received from the block MRNUM 34 regardless of the result of the roaming number determination, i.e., either with the roaming number digits in the event of a successful roaming number selection, or with congestion as a reason for rejection of the call.

Upon reception of signal FETCHRNB, an idle MRNUM task individual is to be seized. If no available MRNUM individuals are found, the roaming number rejection message, that is, signal MRNRO, is sent to the block SIGBLOC 30. Otherwise, a check is made to verify if the subscriber data record is connected, and if so, if his categories have been retrieved. This latter check involves signal pair GETVSUBINFO/GETVSUBINFOR. If the subscriber data record is not connected, the signal FETCHRBNR is returned to the MVRP block 42 (with congestion as the reason for the rejection of the call). The seized MRNUM individual is released, and the roaming number rejection message (signal MRNRO) is sent to the block SIGBLOC 30. If the subscriber is connected, and the categories have been found, a selection of the roaming number is performed, depending upon the dynamic allocation of roamer routing numbers activity status.

Still further on the subject of roamer number determination, it is important to consider what happens if the visitor's SNB is selected and returned as a roaming number. If the dynamic allocation of roamer routing number is not activated, the block MRNUM 34 requests translation of the SC-pointer, previously fetched from the block MTV 38 by the signal pair GETVSUBINFO/GETVSUBINFOR, into an SNB by sending the signal TRSCIND. As a result, a subscriber number (SNB) is received in signal TRSCINDR and will be returned as a roaming number in the signal FETCHRNBR to the block MVRP 42. The number is then sent in the roaming number message (MRNMO) to the roaming signal block SIGBLOC 30. The seized MRNUM individual is freed and available for another call set-up. The MVRP individual is then also released.

Still yet further with respect to roaming number determination, it is also important to consider what happens when the dynamically allocated roamer routing number is selected and returned as a roaming number. If dynamic allocation of roamer routing numbers is activated (by means of an exchange parameter, MIS1, in the command EXRBC), then, an idle roamer routing number (RRNB) record is selected. If no idle RRNB record is found, congestion is marked in return signal FETCHRNBR to the MVRP block 42 and a roaming number rejection message is sent from the MVRP block 42 to the SIGBLOC block 30. Both MVRP and MRNUM individuals seized for a roaming number determination are released. Otherwise, the selected RRNB record is marked "busy", i.e., "selected as a roamer routing number" and the visitor's MSNB is stored in the selected record.

If less than a certain number, e.g., twenty percent, of the roamer routing numbers available for selection are idle, an advance congestion alarm can be set (signal FAULT). An appropriate printout can then be initiated in an alarm signal. Upon reception of the fault parameters from ALA in signal REFO, the MRNUM block 34 can print the user part of the alarm printout. Signal REFOACK can then be sent to ALA as an acknowledgment.

Upon a successful selection of the roamer routing number, time supervision is started in the MRNUM block 34 for the call delivery, i.e., the routing of the call from the visitor's home exchange to the visited/cooperating exchange. The selected RRNB is then sent to the MVRP block 42 in signal FETCHRNBR and the MRNUM individual is released. The roaming number message (signal MRNMO), containing the selected RRNB to answer the roaming number inquiry, can be sent to the roaming signalling block SIGBLOC 30. The MVRP individual can then be released.

With respect to call delivery, after a roamer routing number has been selected and sent to the home exchange, the call can be expected to be routed back to the visiting exchange. This event is time supervised. It should be recognized that two possible events may occur: either the call may be routed back to the visited exchange or the time supervision period may elapse in the MRNUM block 34. The time supervision timeout will occur if the call was not properly routed to the visited exchange. In such a case, the time supervision is stopped, the roamer routing number is released for another call.

When the call is properly routed to the visited exchange, the signal SEIZEOLINK is received from the RE block 44, ordering the seizure of an idle MRNUM individual for a call delivery. If no idle NRNUM individual is available, the signal OCONG is sent to the block RE 44 and the call is rejected. When an idle task individual is seized in the block MRNUM 34, the signal OSEIZED is sent to the RE block 44 to acknowledge the seizure.

Once the MRNUM individual has been successfully seized by the RE block 44 for call delivery, the signal ODISC from the block 44 may be received in the MRNUM block 34 at any time, indicating a disconnection order determined in the RE block 44. In such a case, the MRNUM individual is released, and the signal ODISCED is to be sent to the RE block 44 as an acknowledgement. Otherwise, the RE block 44 informs the MRNUM block 34 that the digits are ready for transmission by sending the signal CALL. Upon reception of the CALL signal, the MRNUM block 34 requests the roamer routing number digits from the RE block 44 by sending the signal OGRA(4). The first available digits are sent with the signal OBNR. As it is possible that not all available digits were transmitted in OBNR, the signal ONEXTBD is sent to the RE block 44 to request the next available digit. If there are no remaining digits left, the signal OGR4 is returned to the MRNUM block 34 as an acknowledgment of the end of digital transmission. Otherwise, the next digit is received from the RE block 44 within the signal OGR1. The MRNUM block 34 then requests the transmission of another digit from the RE block 44, by sending the signal ONEXTBD. This will continue until the signal OGR4 is received from the RE block 44 to indicate that the transmission of roamer routing number digits has been successfully completed.

If the length of the received roamer routing number is not correct, i.e., if the number of digits is not equal to, e.g., 10, the signal OCODE with an end of selection code can be sent to the RE block 44 in order to reject the call and initiate a disconnection ordered by the RE block 44 which can be accomplished by a signal pair ODISC/ODISCED. The MRNUM individual seized for call delivery may then be released.

In order to access the RRNB record holding the associated MSNB, a pointer to the record may be calculated. The internal routing number, received in the signal SEIZEOLINK is multiplied by, e.g., 100, in order to get the RRNB series starting pointer. The last two RRNB digits are then added to the RRNB series start point in order to get the pointer to the desired RRNB record.

If the roamer routing number is not valid, e.g., if the route assigned to the actual roamer routing number series is not active, an end of selection code can be sent to the RE block 44 via signal OCODE in order to reject the call. This will initiate a disconnection order by the RE block 44 via signal pair ODISC/ODISCED. The MRNUM individual seized for call delivery may then be released.

As mentioned earlier, the call delivery event is time supervised. In case the time supervision has elapsed, the roaming routing number may be freed for the next call set-up by marking the time supervised RRNB record idle and stopping the time supervision. Since the occurrence of the time supervision timeout does not affect the transmission of the concerned RRNB digits from the RE block 44, it is possible for a seizure attempt of that particular RRBN record for call delivery may follow after it has already been freed due to the timeout. Accordingly, this will result in rejection of the call, caused by the incorrect state of the RRNB record ("idle" instead of "selected as a roamer routing number", as is expected in a normal case).

Once the roamer routing number is determined to be valid, time supervision is stopped. A check is then done to see if the seized RRNB record is in the correct state, i.e., busy ("selected as a roamer routing number"). If the state is correct, the previously stored MSNB is copied into the MRNUM individual and the RRNB is to be released. Otherwise, if the record is marked idle, an end of selection code (signal OCODE) may be sent to the RE block 44 in order to reject the call. A disconnection determined in the RE block 44 may follow via a signal pair ODISC/ODISCED. Then, the MRNUM individual seized for call delivery may be released.

The release of the roamer routing number (RRNB) involves resetting of the congestion alarm if more than a certain percentage e.g., thirty percent, of the roamer routing numbers are available for selection and the alarm has been previously activated. The signal COFAULT may be sent to the alarm system in order to cancel the alarm by deleting the alarm from the alarm list. An appropriate alarm ceasing printout may then be initiated in the alarm system. Upon reception of the fault parameters from ALA in signal REFO, the MRNUM block 34 may print the user part of the alarm printout. Signal REFOACK may then be sent to ALA as an acknowledgment.

The MRNUM block 34 sends the signal FINDMS to the MDA block 32 (resulting in sending of the signal FINDVMS to MDAV) to translate the MSNB into an MTV-pointer in order to find the visitor data record.

As already mentioned, the signal ODISC may be received from the RE block 44 at any time indicating a disconnection determined in the RE block 44. If that is the case, the event may be buffered and then, as a result, the MRNUM block 34 may send an end of selection code to the RE block 44 via signal OCODE in order to reject the call. Then, both the RRNB record and the MRNUM individual seized for call delivery may be released. A disconnection may be acknowledged by means of the ODISCED signal returned to the RE block 44.

An unsuccessful translation, e.g., if a data record for the MSNB is not found, may be indicated by reception of the signal MSNOFOUND from the MDA/MDAV block 32. If translation is successful, a subscriber block reference and a pointer are returned in an MSFOUND signal. A check may be done for subscriber type. In case of either an unsuccessful translation or incorrect subscriber type (other than a visitor connected with automatic roaming) an end of selection code may be sent to the RE block 44 via signal OCODE in order to reject the call. A disconnection procedure may then be ordered by the RE block 44 via signal ODISC/ODISCED and the release of RRNB and MRNUM individual seized for call delivery may take place. Otherwise, the SC-pointer and the visitor's actual connection status are fetched from the MTV block 38 with the signal pair FETCHMSDATA/FETCHMSDATAR using the MTV-pointer in order to verify that the subscriber is a visitor connected as an automatic roamer. If that is not the case, an end of selection code will be sent to the RE block 44 via signal OCODE, resulting in an already described disconnection procedure determined in the RE block 44, which procedure involves signal pair ODISC/ODISCED.

Normally, translation of the SC-pointer into a subscriber number (SNB) is then requested from the SC block 46 by means of the signal TRSCIND. The subscriber number is returned to the MRNUM block 34 and the signal TRSCINDR. If a disconnection has been received from the RE block 44, disconnection procedure will take place as described above. The subscriber number (SNB) is then sent to the RE block 44 with an order to restart the B-number analysis involving signal OFBNR. The RE block 44 will then order disconnection of the MRNUM block 34 by sending the ODISC signal. The MRNUM individual may then be released. The MRNUM block 34 may acknowledge a disconnection by sending the ODISCED signal to the RE block 44.

Figure 4:
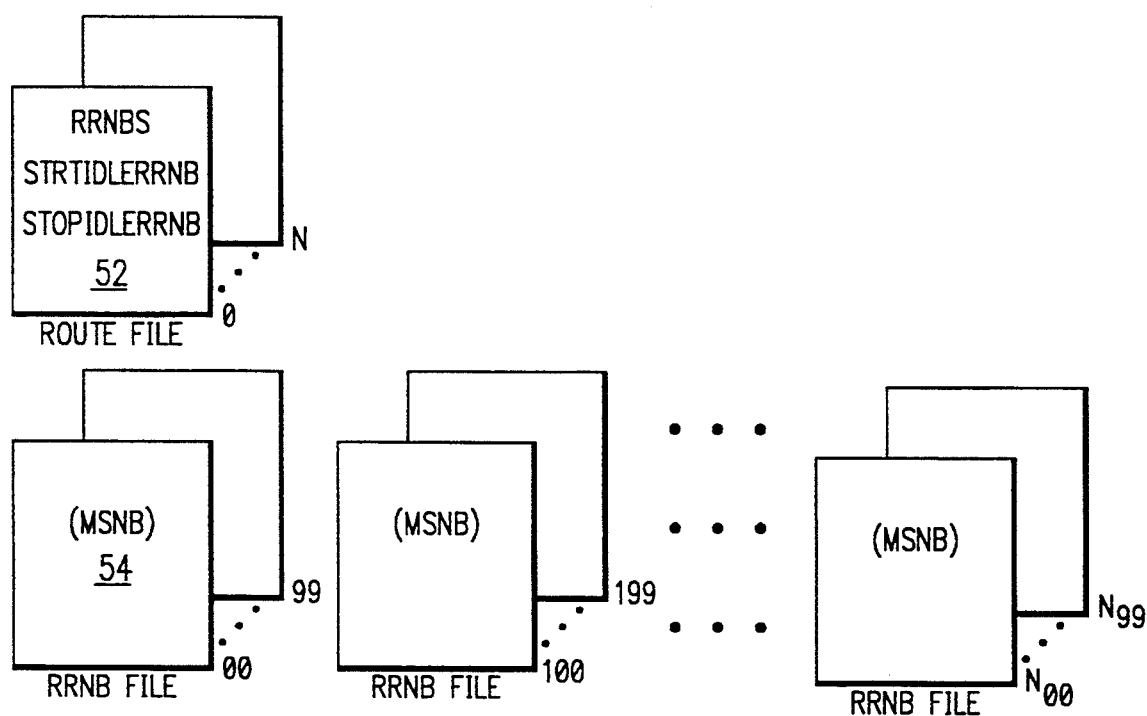
FIG. 4 is a schematic diagram of a MRNUM block according to the teachings of the present invention.

Referring now to FIG. 4, further details regarding the MRNUM block 34 are set forth. The MRNUM block 34 may be seen to consist of a size alterable route file 52 and an associated roamer routing file 54. For each route record, 50 RRNB records may be allocated. The RRNBs available for selection from the route are put into an idle list.

At the seizure of a roamer routing number, an active route with available roamer routing numbers may be selected. An RRNB record is then selected from the associated idle list and updated with the visitor's MSNB. The roamer routing number is then used to answer the roaming number inquiry.

At call delivery, i.e., at seizure of an MRNUM route by RE, the internal route pointer multiplied by 100 gives a start pointer for the RRNBs. By adding the last two digits of the RRNB to the start pointer the record holding the MSNB may be accessed. Once the SNB is obtained, it may be passed to the RE to restart the B-number analysis. The RRNB may then be returned to the idle list.

A size alterable task file may also be necessary to handle roaming number inquiry and call delivery procedures.

By way of example only, set forth immediately below is a sequence diagram that should be of significant value for those skilled in the art in completely understanding the structure and operation of the present invention.

| LABEL | FUNCTION | EXT | INTERWORK MDA/MDAV MRNUM MVRP | MTV | OTHER | SIGNAL | DATA |
|---|---|---|---|---|---|---|---|
| | START CONDITION THE MSNB (IMSI) OF A VISITOR HAS BEEN RECEIVED FOR THE ROAMING DETERMINATION 2. RECEPTION OF A ROAMING NUMBER INTERROGATION | | | | SIGBLOC | | |
| | ROAMING NUMBER INTERROGATION RECEIVED | | ↓ | | | MRIMI | D1 SEND. IND. D2 SEND. BL. REF. D3 MSNB LENGTH D4 MSNB DIG 1-4 D5 MSNB DIG 5-8 D6 MSNB DIG 9-10 |
| | SEIZE AN IDLE MVRP-INDIVIDUAL IF <MVRP-ROUTE NOT DEFINED> THEN MARK CONGESTION SEND THE ROAMING NUMBER REJECTED MESSAGE END ENDIF | | ↑ | | SIGBLOC | MRNRO | D1 REC. IND D2 REASON |
| | IF <NO MVRP-INDIVIDUAL AVAILABLE> THEN MARK CONGESTION SEND THE ROAMING NUMBER REJECTED MESSAGE END ENDIF | | ↑ | | SIGBLOC | MRNRO | D1 REC. IND D2 REASON |
| | ASK PROCESSOR CAPACITY | OMS ↓ | | | | SEIZECAPT | D1 ROUTE ID. D2 SEND. IND. D3 SEND. BL. REF. |
| | CASE <CAPACITY> | OMS ↑ | | | | | |
| | <INSUFFICIENT CAPACITY> | | | | | CAPCONG | D1 REC. IND. |
| | GOTO 100 | | | | | | |

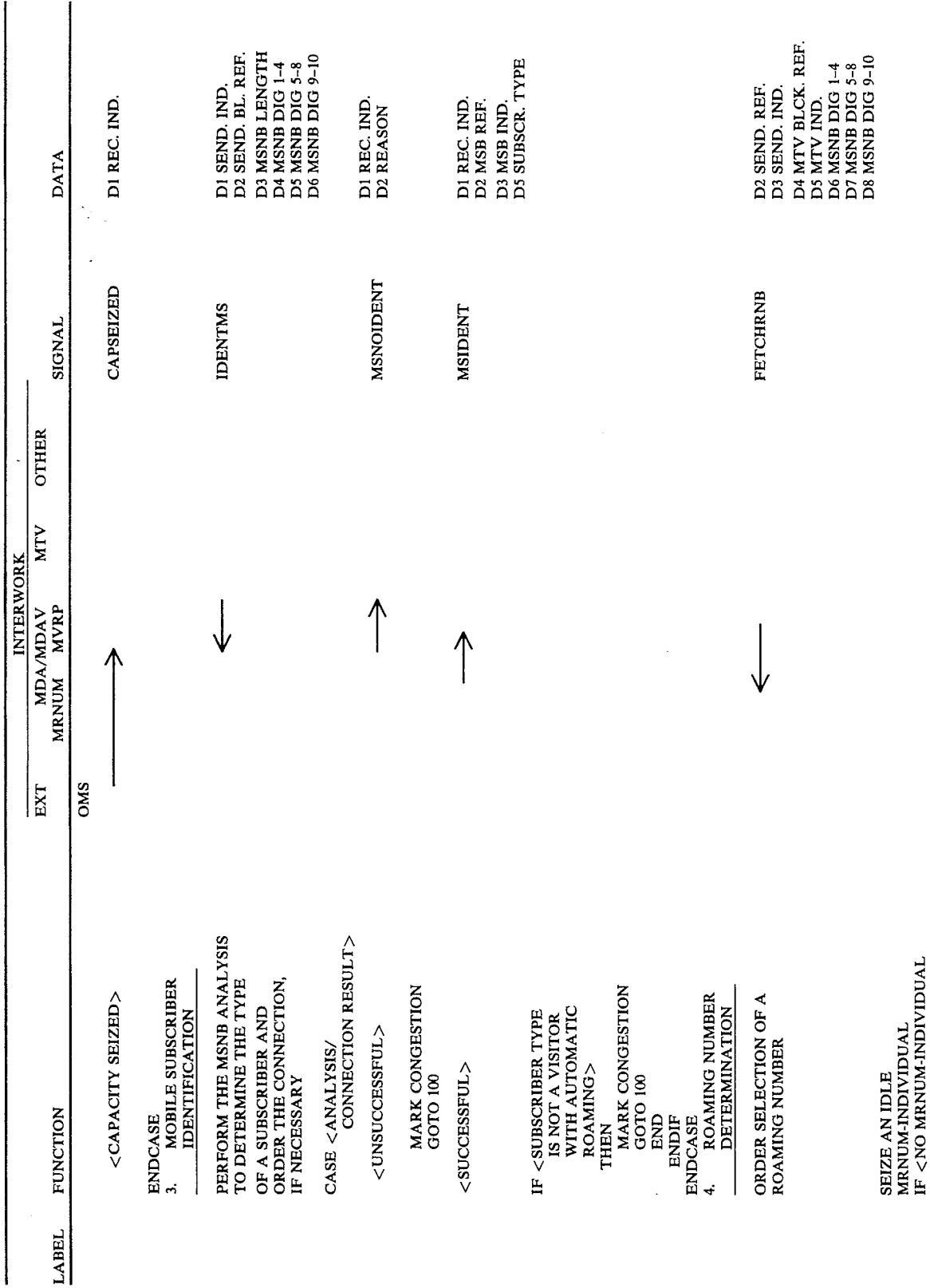

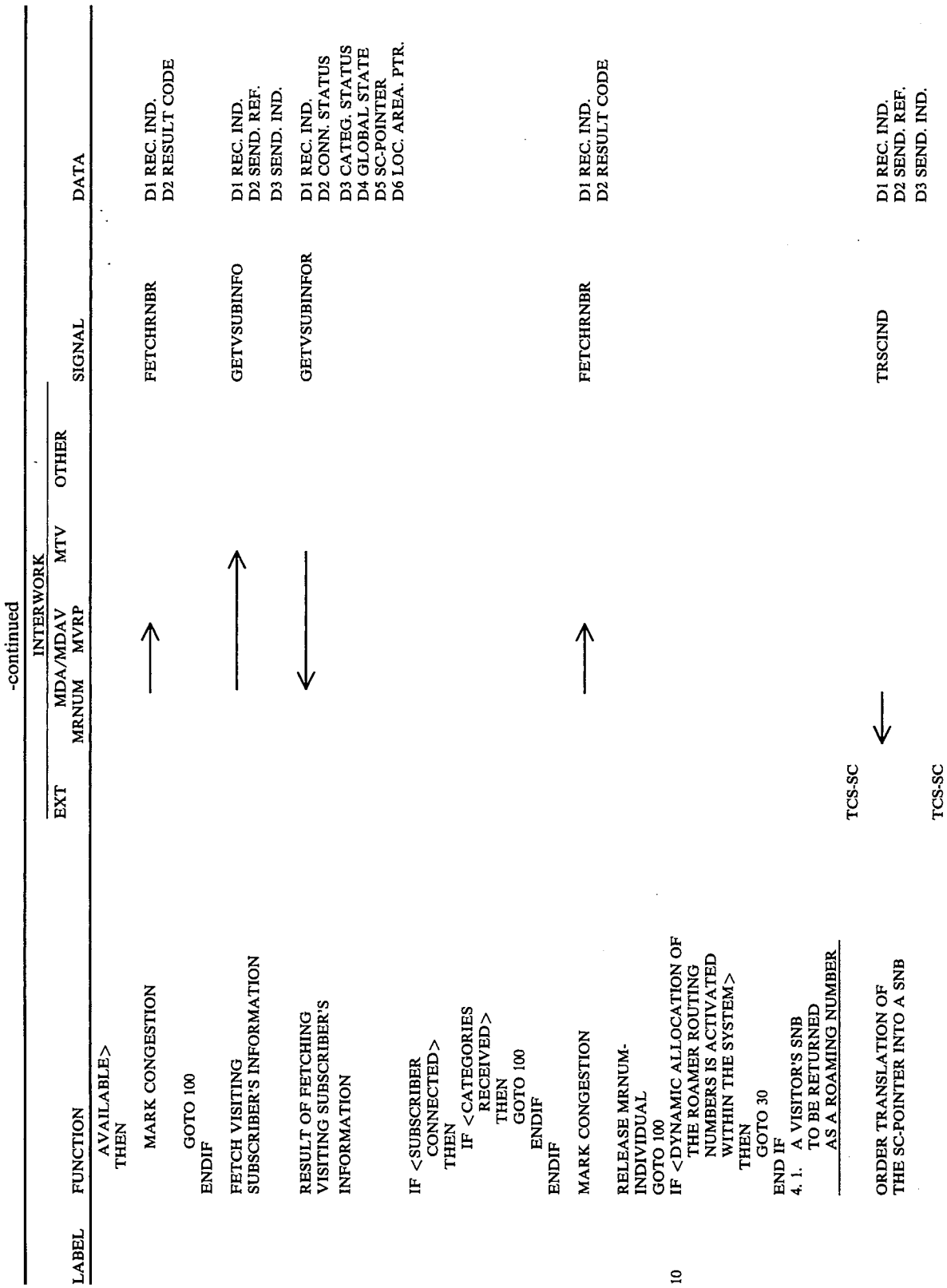

-continued

| LABEL | FUNCTION | EXT | INTERWORK MDA/MDAV MRNUM MVRP | MTV | OTHER | SIGNAL | DATA |
|---|---|---|---|---|---|---|---|
| | SNB RECEIVED | | → | | | TRSCINDR | D1 REC. IND. D3 SNB LENGTH D4 SNB DIG 1-4 D5 SNB DIG 5-8 D6 SNB DIG 9-10 |
| | SNB RETURNED AS A ROAMING NUMBER | | | | | FETCHRNBR | D1 REC. IND. D2 RESULT CODE D3 SNB LENGTH D4 SNB DIG 1-4 D5 SNB DIG 5-8 D6 SNB DIG 9-10 |
| | RELEASE MRNUM-INDIVIDUAL | | | | SIGBLOC | | |
| | SEND THE ROAMING NUMBER MESSAGE | | ↑ | | | MRNMO | D1 REC. IND. D3 RNB LENGTH D4 RNB DIG 1-4 D5 RNB DIG 5-8 D6 RNB DIG 9-10 |
| | RELEASE MVRP-INDIVIDUAL END 4.2. A DYNAMICALLY ALLOCATED ROAMER ROUTING NUMBER TO BE RETURNED AS A ROAMING NUMBER SELECT AN IDLE ROAMER ROUTING NUMBER CASE <RRNB SELECTION RESULT> <NO RRNB AVAILABLE> | | | | | | |
| | MARK CONGESTION | | | | | FETCHRNBR | D1 REC. IND. D2 RESULT CODE |
| 30 | RELEASE MRNUM-INDIVIDUAL GOTO 100 <RRNB SELECTED> MARK RRNB SELECTED AS ROAMER ROUTING NUMBER STORE THE MSNB IN A SELECTED RRNB RECORD ENDCASE IF <LESS THAN 20% OF THE RRNB'S ARE IDLE AND THE LOAD SUPERVISION ALARM HAS NOT BEEN SET> | | | | | | |

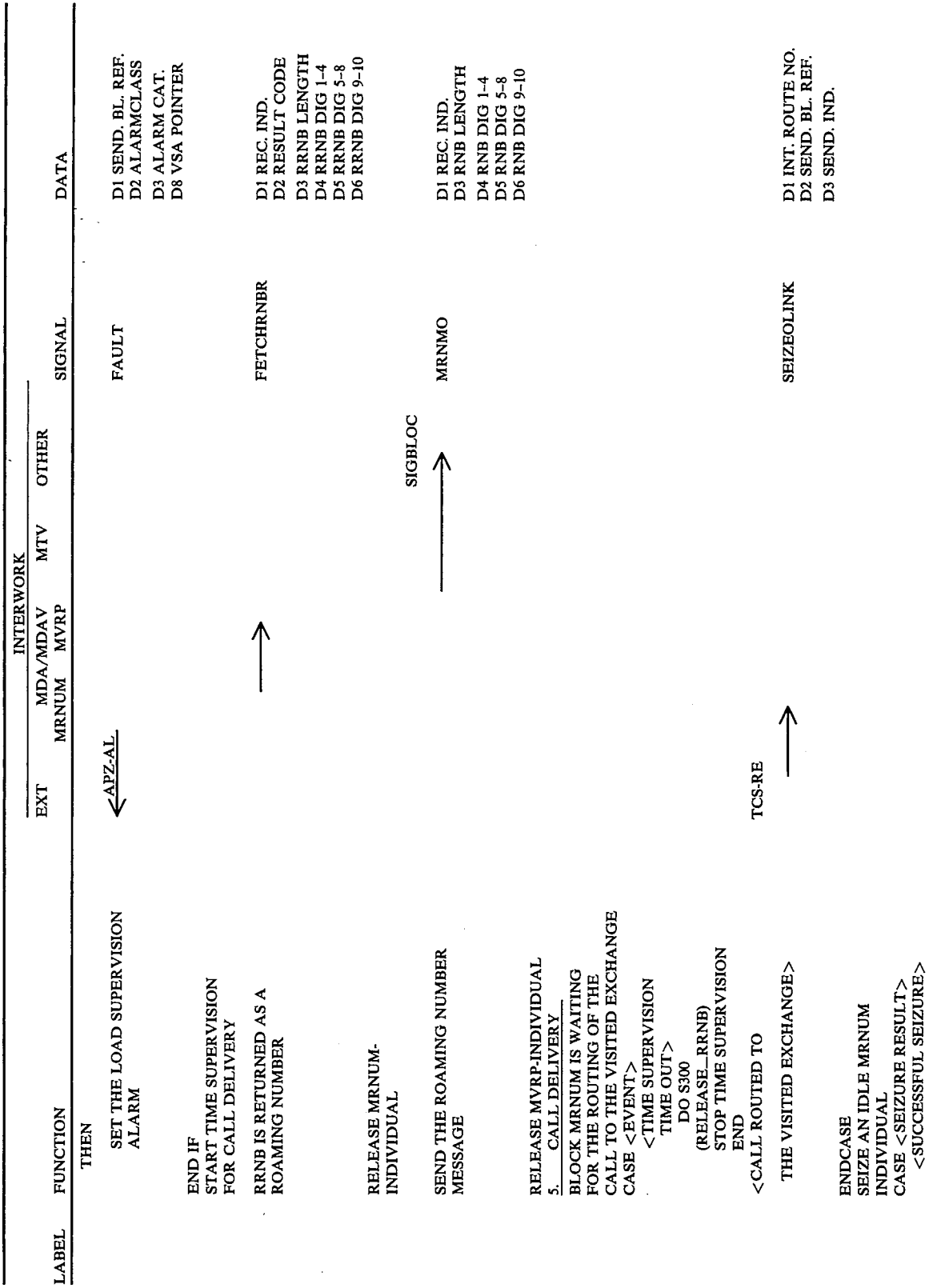

-continued

| LABEL | FUNCTION | EXT | MDA/MDAV MRNUM MVRP | MTV | OTHER | SIGNAL | DATA |
|---|---|---|---|---|---|---|---|
| | INDIVIDUAL SEIZED | ←TCS-RE | | | | OSEIZED | D1 REC. IND.<br>D2 SEND. BL. REF.<br>D3 SEND. IND. |
| | <CONGESTION><br>CALL REJECTED<br>END<br>ENDCASE<br>CASE <NEXT EVENT> | ←TCS-RE | | | | OCONG | D1 REC. IND. |
| 40 | <THE RRNB DIGITS READY FOR TRANSMISSION> | TCS-RE→ | | | | CALL | D1 REC. IND.<br>D3 SIGNAL INFO |
| | REQUEST THE RRNB DIGITS<br>GOTO 40 | ←TCS-RE | | | | OGRA(4) | D1 REC. IND.<br>D2 SIG. NUMBER |
| | <FIRST AVAILABLE RRNB DIGITS RECEIVED> | TCS-RE→ | | | | OBNR | D1 REC. IND.<br>D2 RRNB LENGTH<br>D3 RRNB DIG 1-4<br>D4 RRNB DIG 5-8<br>D5 RRNB DIG 9-10<br>D10 END MARK |
| | REQUEST THE NEXT RRNB DIGIT<br>GOTO 40 | ←TCS-RE | | | | ONEXTBD | D1 REC. IND. |
| | <REMAINING RRNB DIGIT TRANSMITTED> | TCS-RE→ | | | | OGR1 | D1 REC. IND.<br>D2 RRNB DIGIT |
| | REQUEST THE NEXT RRNB DIGIT<br>GOTO 40 | ←TCS-RE | | | | ONEXTBD | D1 REC. IND. |
| | <END OF RRNB DIGITS TRANSMISSION> | TCS-RE→ | | | | OGR4 | D1 REC. IND.<br>D2 END TRANSMIT. |
| | IF <INCORRECT RRNB LENGTH><br>THEN<br>CALL REJECTED | ←TCS-RE | | | | OCODE | D1 REC. IND.<br>D2 EOS CODE |
| | GOTO 40<br>ENDIF<br>CALCULATE A POINTER TO THE RRNB RECORD, USING THE INTERNAL ROUTE POINTER AND | | | | | | |

-continued

| LABEL | FUNCTION | EXT | INTERWORK MDA/MDAV MRNUM MVRP | MTV | OTHER | SIGNAL | DATA |
|---|---|---|---|---|---|---|---|
| | THE LAST TWO RRNB DIGITS IF <RRNB NOT VALID> THEN | | | | | | |
| | CALL REJECTED | | ←TCS-RE | | | OCODE | D1 REC. IND. D2 EOS CODE |
| | GOTO 40 ENDIF STOP TIME SUPERVISION. CASE <RRNB STATE> <SELECTED AS ROAMER ROUTING NUMBER> GOTO 50 <IDLE> <SEIZED FOR CALL DELIVERY> ENDCASE | | | | | | |
| | CALL REJECTED | | ←TCS-RE | | | OCODE | D1 REC. IND. D2 EOS CODE |
| | GOTO 40 <DISCONNECTION ORDERED BY RE> RELEASE MRNUM-INDIVIDUAL | | TCS-RE→ | | | ODISC | D1 REC. IND. |
| | DISCONNECTION ACKNOWLEDGED END ENDCASE | | ←TCS-RE | | | ODISCED | D2 REC. IND. |
| 50 | DOS300 (RELEASE-RRNB) COPY MSNB INTO MRNUM TASK INDIVIDUAL | | | | → | | |
| | ORDER TRANSLATION OF THE MSNB INTO A MTV-POINTER (FIND VISITOR DATE RECORD) | | → | | | FINDMS | D1 SEND. IND. D2 SEND. BL. REF. D3 MSNB. LENGTH D4 MSNB DIG 1-4 D5 MSNB DIG 5-8 D6 MSNB DIG 9-10 |
| 60 | CASE <NEXT EVENT> <TRANSLATION UNSUCCESSFUL, DATA RECORD FOR GIVEN MSNB NOT FOUND> | | ↓ | | | MSNOFOUND | D1 REC. IND. D2 RESULT CODE D6 SUBSC. TYPE |
| | CALL REJECTED | | ←TCS-RE | | | OCODE | D1 REC. IND. D2 EOS CODE |
| | MARK WAITING FOR DISCONNECTION | | | | | | |

| LABEL | FUNCTION | INTERWORK |  |  |  | SIGNAL | DATA |
|---|---|---|---|---|---|---|---|
| | | EXT | MDA/MDAV MRNUM MVRP | MTV | OTHER | | |
| | GOTO 60 | | | | | | |
| | \<TRANSLATION SUCCESSFUL, MSB REFERENCE AND POINTER RETURNED\> | | ↓ | | | MSFOUND | D1 REC. IND. D2 MSB BL. REF. D3 MSB IND. D5 SUBSC. TYPE |
| | IF \<SUBSCRIBER TYPE OTHER THAN VISITOR WITH AUTOMATIC ROAMING\> THEN | | | | | | |
| | CALL REJECTED | ←——TCS-RE | | | | OCODE | D1 REC. IND. D2 EOS CODE |
| | MARK WAITING FOR DISCONNECTION GOTO 60 END IF IF \<DISCONNECTION ORDERED BY RE\> THEN GOTO 200 ENDIF | | | | | | |
| | READ THE SC-POINTER AND VISITOR'S CONNECTION STATUS GOTO 60 | | ↑ | | | FETCHMSDATA | D1 REC. IND. D2 SEND. BL. REF. D3 SEND. IND. |
| | \<VISITING SUBSCRIBER'S DATA RECEIVED\> | | ↓ | | | FETCHMSDATAR | D1 REC. IND. D2 RESULT CODE D4 SC-POINTER |
| | IF \<VISITOR NOT CONNECTED\> THEN | | | | | | |
| | CALL REJECTED | ←——TCS-RE | | | | OCODE | D1 REC. IND. D2 EOS CODE |
| | MARK WAITING FOR DISCONNECTION GOTO 60 ENDIF IF \<DISCONNECTION ORDERED BY RE\> THEN GOTO 200 ENDIF | | | | | | |
| | ORDER TRANSLATION OF THE SC-POINTER INTO A SNB GOTO 60 | ←——TCS-SC | | | | TRSCIND | D1 REC. IND. D2 SEND. BL. REF. D3 SEND. IND. |

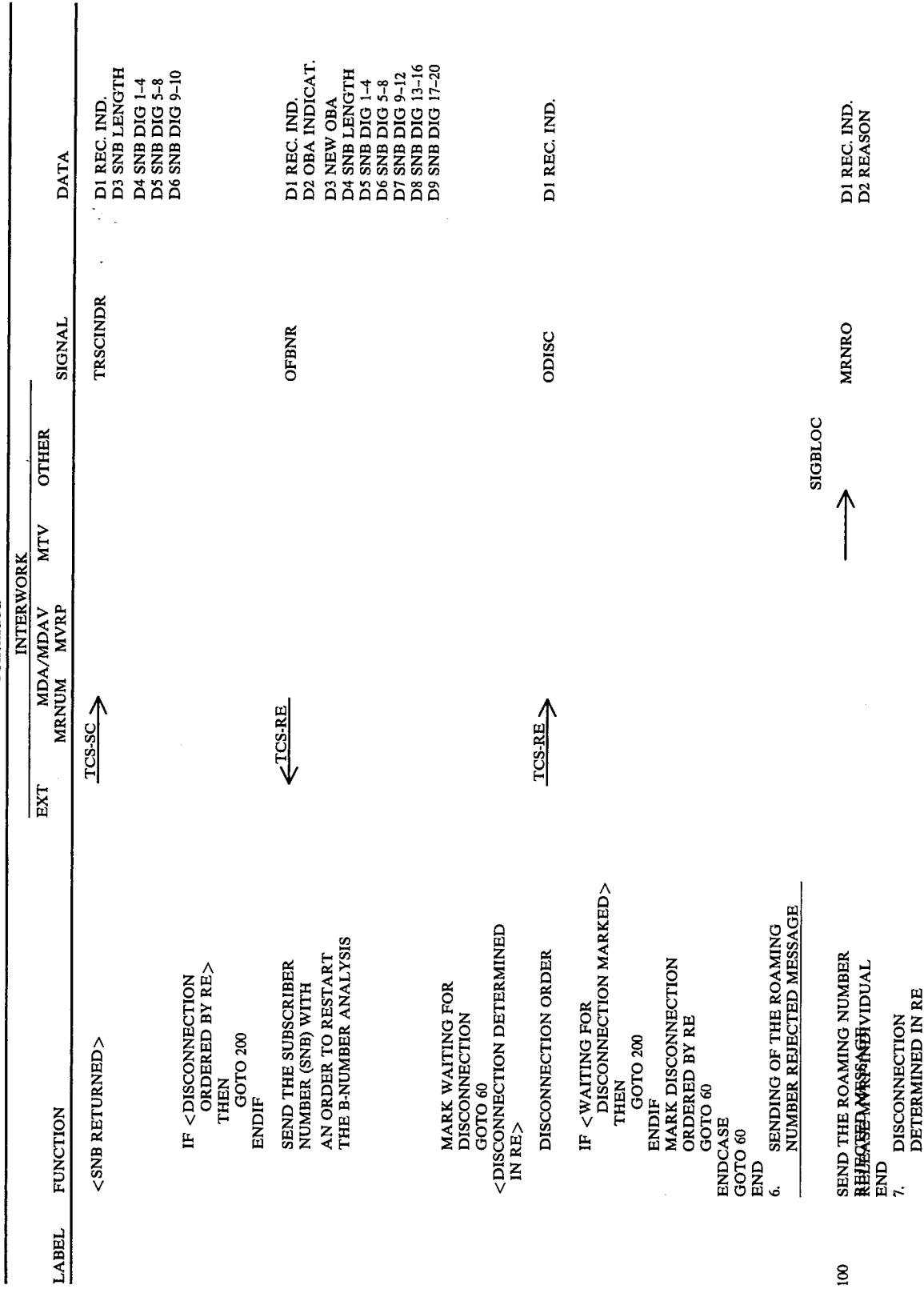

-continued

| LABEL | FUNCTION | EXT | INTERWORK MDA/MDAV MRNUM MVRP | MTV | OTHER | SIGNAL | DATA |
|---|---|---|---|---|---|---|---|
| 200 | RELEASE MRNUM-INDIVIDUAL | | | | | | |
| | DISCONNECTION ACKNOWLEDGED | ←TCS-RE | | | | ODISCED | D2 REC. IND. |
| | END | | | | | | |
| | 8. ALARM HANDLING | | | | | | |
| | PRINT LOAD SUPERVISION ALARM | | | | | | |
| | PRINT ALARM "ROAMER ROUTING NUMBER LOAD SUPERVISION" | | APZ-ALA→ | | | REFO | D1 I/O IDENT. D2 AL. PRINT CODE D5 VSA POINTER |
| | PRINT ACKNOWLEDGED | | ←APZ-ALA | | | REFOACK | D1 ERR. CODE |
| | 9. SUBROUTINE | | | | | | |
| | 9.1 RELEASE_RRNB | | | | | | |
| S300 | RELEASE THE ROAMER ROUTING NUMBER | | | | | | |
| | IF <MORE THAN 30% OF THE RRNB'S AVAILABLE FOR SELECTION ARE IDLE AND THE SUPERVISION ALARM IS SET> THEN | | | | | | |
| | REQUEST ALARM CEASED PRINTOUT | | ←APZ-AL | | | COFAULT | D1 SEND. BL. REF. D2 ALARMCLASS D3 ALARMCAT. D8 VSA POINTER |
| | ENDIF | | | | | | |
| | RETURN | | | | | | |

An aspect of certain embodiments of the present invention which is worth noting relates to releasing numbers of incompleted calls. For example, it is possible that after the MSC-H requests a roamer routing number from the MSC-V, such a number is selected by the MSC-V, and the number is passed back to the MSC-H, the MSC-H may determine that the mobile subscriber is not willing to pay for the call to the visited exchange. At that point the process stops, with a number seized within the MSC-V. To solve this problem, embodiments of the present invention can include means for releasing such a number when not used after a predetermined period of time, e.g., ten seconds.

Figure 5:
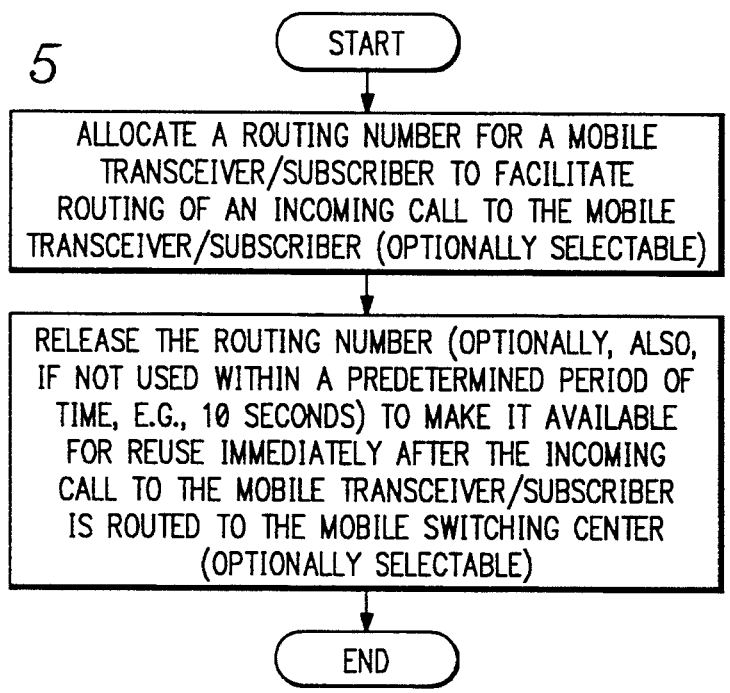
FIG. 5 is a flow diagram of the process by which the present invention releases routing numbers after an incoming call is routed to a mobile switching center.

Referring now to FIG. 5, a process is shown by which the present invention releases routing numbers after an incoming call is routed to a mobile switching center. First, the system allocates a routing number for a mobile transceiver/subscriber in order to facilitate the routing of an incoming call to the mobile. Next, if the routing number is not used within a predetermined period of time (e.g., 10 seconds), the system releases the routing number in order to make it available for reuse immediately after the incoming call to the mobile is routed to the mobile switching center.

Figure 6:
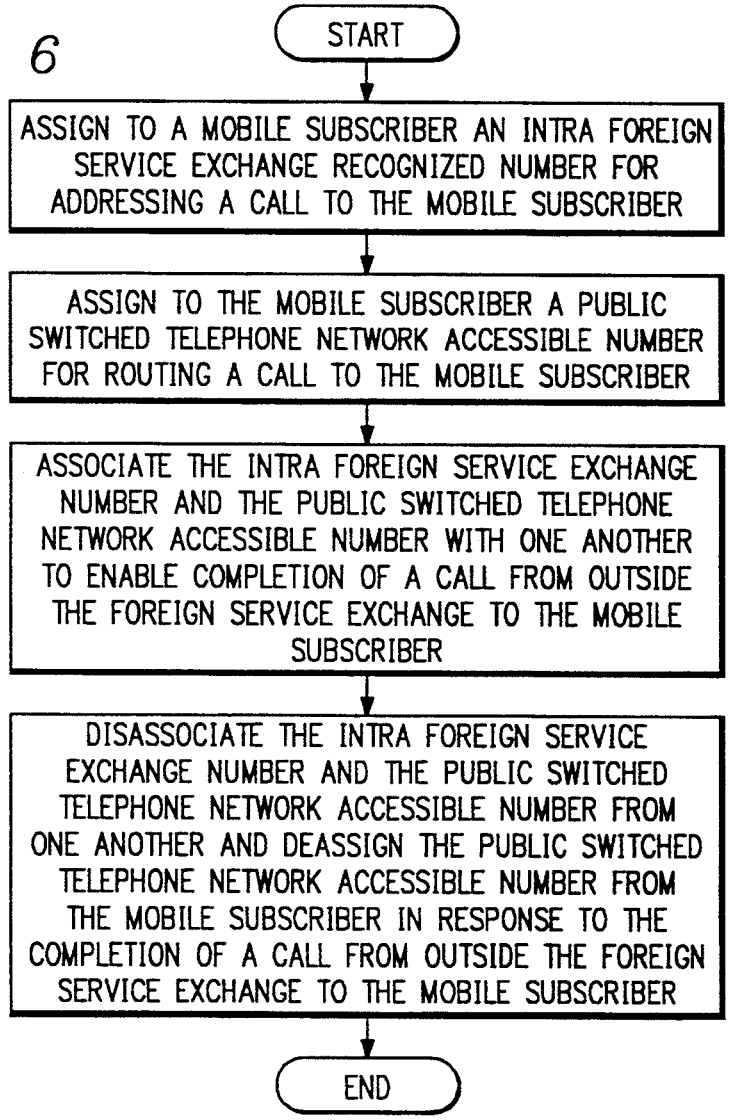
FIG. 6 is a flow diagram of the process by which the present invention associates intra-foreign exchange numbers and public switched telephone network numbers in order to complete calls from outside a foreign service exchange to a mobile subscriber.

Referring now to FIG. 6, a process is shown by which the present invention associates intra-foreign exchange numbers and public switched telephone network (PSTN) numbers in order to complete calls from outside a foreign service exchange to a mobile subscriber. First, the system assigns to the mobile subscriber an intra-foreign service exchange recognized number for addressing a call to the mobile subscriber. Next, the system assigns to the mobile subscriber a PSTN accessible number for routing a call to the mobile subscriber. Next, the system associates the intra-foreign service exchange number and the PSTN accessible number with one another in order to enable completion of a call from outside the foreign service exchange to the mobile subscriber. Finally, the system disassociates the intra-foreign service exchange number and the PSTN accessible number from one another and deassigns the PSTN accessible number from the mobile subscriber in response to the completion of a call from outside the foreign service exchange to the mobile subscriber.

Figure 7:
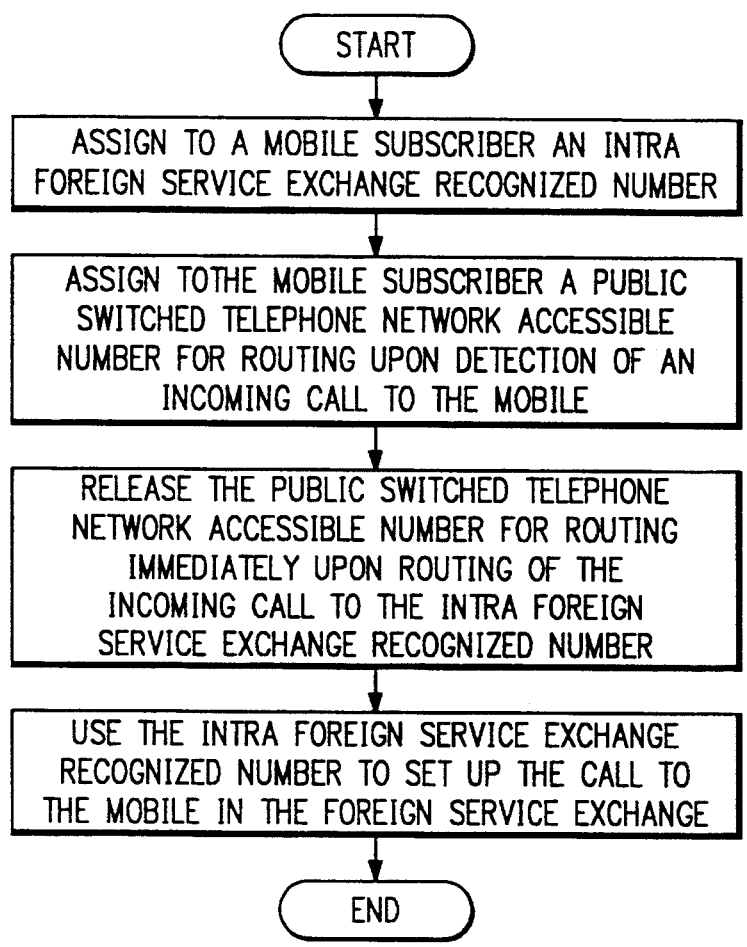
FIG. 7 is a flow diagram of the process by which the present invention releases public switched telephone network numbers immediately upon routing of an incoming call to an assigned intraforeign service exchange recognized number.

Referring now to FIG. 7, a process is shown by which the present invention releases PSTN numbers immediately upon routing of an incoming call to an assigned intra-foreign service exchange recognized number. First, the system assigns to a mobile subscriber an intra-foreign service exchange recognized number. Next, the system assigns to the mobile subscriber a PSTN accessible number for routing upon detection of an incoming call to the mobile subscriber. Next, the system releases the PSTN accessible number for routing immediately upon routing of the incoming call to the intra-foreign service exchange recognized number. Finally, the system uses the intra-foreign service exchange recognized number to set up the call to the mobile subscriber in the foreign service exchange.

Figure 8:
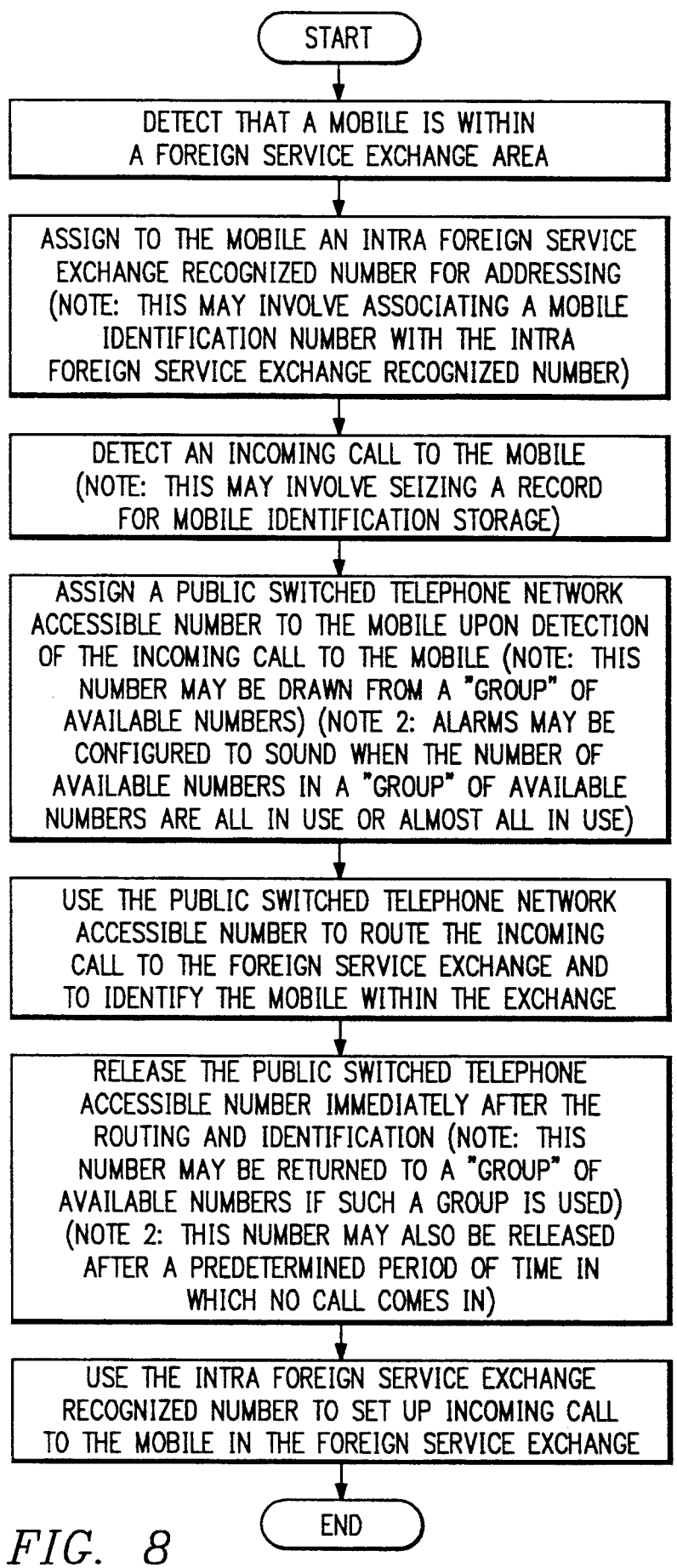
FIG. 8 is a flow diagram of the process by which the present invention releases public switched telephone network numbers immediately upon routing an incoming call and identifying a mobile subscriber, and thereafter uses an intra-foreign service exchange recognized number to set up a call to the mobile in a foreign service exchange.

Referring now to FIG. 8, a process is shown by which the present invention releases PSTN numbers immediately upon routing an incoming call and identifying a mobile subscriber, and thereafter uses an intra-foreign service exchange recognized number to set up a call to the mobile subscriber in a foreign service exchange. First, the system detects that a mobile subscriber is within a foreign service exchange area. Next, the system assigns to the mobile subscriber an intra-foreign service exchange recognized number for addressing. This step may involve associating a mobile identification number with the intra-foreign service exchange recognized number. Next, the system detects an incoming call to the mobile subscriber. This step may involve seizing a record for mobile identification storage. Next, the system assigns a PSTN accessible number to the mobile subscriber upon detection of the incoming call to the mobile subscriber. This PSTN number may be drawn from a "group" of available numbers. Additionally, alarms may be configured to sound when the number of available numbers in a group of available numbers are all in use or almost all in use. Next, the system uses the PSTN accessible number to route the incoming call to the foreign service exchange and to identify the mobile subscriber within the exchange. Next, the system releases the PSTN accessible number immediately after the routing and identification. The PSTN number may be returned to a group of available numbers if such a group is used. This number may also be released after a pre-determined period of time in which no call comes in. Finally, the system uses the intra-foreign service exchange recognized number to set up the incoming call to the mobile in the foreign service exchange.

Based on the foregoing, it should be clear that the present invention provides a means and method for allocating a temporary number to a visiting mobile station during call set-up. Once the call has been routed back to the visited exchange, the roamer routing number can then be released for use with other incoming call attempts to automatic visitors. The means and method of the present invention is an improvement over the prior art because it provides an inexpensive alternative to leasing a separate subscriber number for each visitor in a system.

Obviously, numerous modifications and variations are possible in view of the above teachings. Accordingly, within the scope of the appended claims, the present invention may be practiced otherwise than as specifically described herein.

What is claimed Is:

1. A communications system comprising:
   at least one mobile transceiver;
   at least one mobile switching center, said at least one mobile switching center comprising:
      optionally selectable means for allocating a routing number for said at least one mobile transceiver to facilitate routing of an incoming call to said mobile transceiver, and
      means operative upon the optional selection of said allocation means for releasing said routing number to make it available for reuse immediately after said incoming call to said mobile transceiver is routed to said at least one mobile switching center.

2. A system as recited in claim 1, further comprising means operable upon the optional selection of said allocating means for releasing said routing number if not used within a predetermined period of time to route said incoming call to said at least one mobile switching center.

3. A system as recited in claim 1, wherein said predetermined period of time is on the order of ten seconds.

4. A method of routing a call to at least one mobile transceiver in a communications system including at least one mobile switching center (MSC), having means for optionally assigning either a temporary routing number or a fixed registered visitor subscriber number to a visiting mobile transceiver present within its coverage area as a number to be used for routing calls to the transceiver from outside its coverage area, said method comprising the steps of:

selecting within said at least one MSC said optionally assignable temporary routing number over said fixed registered visitor subscriber number;

allocating a temporary routing number to said at least one mobile subscriber to facilitate routing an incoming call to said at least one mobile transceiver; and releasing said allocated temporary routing number for reuse after said incoming call is routed to said at least one MSC.

5. A method of providing telecommunications service within a network of exchanges to a mobile subscriber located in a foreign service exchange having means for optionally assigning either a temporary routing number or a fixed registered visitor subscriber number to a visiting mobile transceiver present within its coverage area as a number to be used for routing calls to the transceiver from outside its coverage area, comprising the steps of:

a) selecting within said foreign service exchange said optionally assignable temporary routing number over said fixed registered visitor subscriber number;

b) assigning to said mobile subscriber an intra foreign service exchange recognized number for addressing a call to said mobile subscriber;

c) searching through a group of public switched telephone network accessible numbers within said foreign exchange for a number which is not in use;

d) returning a congestion signal to said network in response to a failure to locate a public switched telephone network accessible number;

e) assigning to said mobile subscriber a public switched telephone network accessible number in response to locating an idle number within said group for routing a call to said mobile subscriber;

f) associating said intra foreign service exchange number and said public switched telephone network accessible number with one another to enable completion of a call from outside said foreign service exchange to said mobile subscriber; and g) disassociating said intra foreign service exchange number and said public switched telephone network accessible number from one another and de-assigning said public switched telephone network accessible number from said mobile subscriber in response to the completion of a call from said network outside said foreign service exchange to said mobile subscriber.

6. A method of providing telecommunications service to a mobile subscriber located in a foreign service exchange having means for optionally assigning either a temporary routing number or a fixed registered visitor subscriber number to a visiting mobile transceiver present within its coverage area as a number to be used for routing calls to the transceiver from outside its coverage area, comprising the steps of:

a) selecting within said foreign service exchange said optionally assignable temporary routing number over said fixed registered visitor subscriber number;

b) assigning to said mobile subscriber an intra foreign service exchange recognized number;

c) assigning to said mobile subscriber a public switched telephone network accessible number for routing upon detection of an incoming call to said mobile;

d) releasing said public switched telephone network accessible number for routing immediately upon routing of said incoming call to said intra foreign service exchange recognized number; and e) thereafter using said intra foreign service exchange recognized number to set up said call to said mobile in said foreign service exchange.

7. A method of setting up calls to a mobile subscriber located in a foreign service exchange area wherein said foreign service exchange contains a group of available public switched telephone network accessible numbers and a near congestion alarm, said mobile subscriber having a home exchange that tracks its location and can store a routing number for said mobile subscriber, said method comprising the steps of:

selecting within said foreign service exchange an optional temporary routing number assignment mode over a fixed registered visitor subscriber number mode;

detecting that said mobile is within said foreign service exchange area;

assigning to said mobile an intra foreign service exchange recognized number for addressing;

detecting an incoming call to said mobile;

assigning a public switched telephone network accessible number to said mobile upon detection of said incoming call to said mobile, said assigned number having been selected from said group of available public switched telephone network accessible numbers;

using said public switched telephone network accessible number to route said incoming call to said foreign service exchange and to identify said mobile within said exchange;

releasing said public switched telephone accessible number immediately after said routing and identification;

thereafter using said intra foreign service exchange recognized number to set up said incoming call to said mobile in said foreign service exchange; and triggering said near congestion alarm when less than a predetermined number of available public switched telephone network accessible numbers are available for use.

8. A system for setting up calls to a mobile subscriber located in a foreign service exchange area wherein said foreign service exchange contains a group of available public switched telephone network accessible numbers and a near congestion alarm, said mobile subscriber having a home exchange that tracks its location and can store a routing number for said mobile subscriber, said system comprising:

means within said foreign service exchange for selecting an optional temporary routing number assignment mode over a fixed registered visitor subscriber number mode;

means for detecting that said mobile is within said foreign service exchange area;

means for assigning to said mobile an intra foreign service exchange recognized number for addressing;

means for detecting an incoming call to said mobile;

means for assigning a public switched telephone network accessible number to said mobile upon detection of said incoming call to said mobile, said assigned number having been selected from said group of available public switched telephone network accessible numbers;

means for using said public switched telephone network accessible number to route said incoming call to said foreign service exchange and to identify said mobile within said exchange;

means for releasing said public switched telephone accessible number immediately after said routing and identification;

means for using said intra foreign service exchange recognized number to set up said incoming call to said mobile in said foreign service exchange; and means for triggering said near congestion alarm when less than a predetermined number of available public switched telephone network accessible numbers are available for use.

9. An exchange network having at least one mobile switching center for establishing communications with at least one mobile subscriber, said mobile switching center comprising:

optionally selectable means for allocating a routing number for said at least one mobile subscriber to facilitate routing of a incoming call within said network to said mobile subscriber; and means operative upon the optional selection of said allocating means for releasing said routing number to make it available for reuse immediately after said incoming call to said mobile subscriber is routed to said at least one mobile switching center.

10. An exchange network having a mobile switching center as recited in claim 9, wherein said means for allocating a routing number for said at least one mobile subscriber to facilitate routing of an incoming call to said mobile subscriber comprises means for selecting a roamer routing number.

11. An exchange network having a mobile switching center as recited in claim 9, wherein said mobile switching center further comprises means for receiving roaming number interrogation.

12. An exchange network having a mobile switching center as recited in claim 11, wherein said means for receiving roamer number interrogation comprises a means for handling messages between exchange subsystems.

13. An exchange network having a mobile switching center as recited in claim 9, wherein said mobile switching center further comprises means for identifying mobile subscribers.

14. An exchange network having a mobile switching center as recited in claim 13, wherein said means for identifying mobile subscribers comprises a mobile telephone visitor routing data provision block.

15. A method of setting up calls to a mobile subscriber located in a foreign service exchange area, including an exchange having means for optionally assigning either a temporary routing number or a fixed registered visitor number to a visiting mobile transceiver present within its coverage area as a number to be used for routing calls to the transceiver from outside its coverage area, said mobile subscriber having a home exchange that tracks its location and can store a routing number for said mobile subscriber, said method comprising the steps of:

selecting within said foreign service exchange said optionally assignable temporary routing number over said fixed registered visitor subscriber number;

detecting that said mobile is within said foreign service exchange area;

assigning to said mobile is within said foregin service exchange recognized number for addressing;

detecting an incoming call to said mobile;

assigning a public switched telephone network accessible number to said mobile upon detection of said incoming call to said mobile;

using said public switched telephone network accessible number to route said incoming call to said foreign service exchange and to identify said mobile within said exchange;

releasing said public switched telephone accessible number immediately after said routing and identification; and thereafter using said intra foreign service exchange recognized number to set up said incoming call to said mobile in said foreign service exchange.

16. A method as recited in claim 15, wherein said mobile has a mobile identification number, and wherein said step of assigning to said mobile an intra foreign service exchange recognized number for addressing comprises the step of associating said mobile identification number with said intra foreign service exchange recognized number.

17. A method as recited in claim 15, further comprising the step of releasing said public switched telephone accessible number after a predetermined amount of time in which no call comes in.

18. A method as recited in claim 15, wherein there is at least one record for mobile identification storage, and wherein said step of detecting an incoming call to said mobile comprises the step of seizing said at least one record for mobile identification storage.

19. A method as recited in claim 15, wherein there is a group of available public switched telephone network accessible numbers, and further comprising the step of selecting said public switched telephone network accessible number to be assigned from said group of available public switched telephone network accessible numbers.

20. A method as recited in claim 19, wherein said public switched telephone accessible number is returned to said group of available public switched telephone network accessible numbers after said public switched telephone accessible number is released.

21. A method as recited in claim 19, wherein there is a congestion alarm, and further comprising the step of triggering said congestion alarm when no available public switched telephone network accessible numbers are available for use.

22. A system for setting up calls to a mobile subscriber located in a foreign service exchange area, including an exchange having means for assigning either a temporary routing number or a fixed registered visitor subscriber number to a visiting mobile transceiver present within its coverage area as a number to be used for routing calls to the transceiver from outside its coverage area, said mobile subscriber having a home exchange that tracks its location and can store a routing number for said mobile subscriber, said system comprising:

means within said foreign service exchange for selecting said optional temporary routing number assignment mode over said fixed registered visitor subscriber number mode;

means for detecting that said mobile is within said foreign service exchange area;

means for assigning to said mobile an intra foreign service exchange recognized number for addressing;

means for detecting an incoming call to said mobile;

means for assigning a public switched telephone network accessible number to said mobile upon detection of said incoming call to said mobile;

means for using said public switched telephone network accessible number to route said incoming call to said foreign service exchange and to identify said mobile within said exchange;

means for releasing said public switched telephone accessible number immediately after said routing and identification; and means for using said intra foreign service exchange recognized number to set up said incoming call to said mobile in said foreign service exchange.

23. A system as recited in claim 22, wherein there is a group of available public switched telephone network accessible numbers, and further comprising means for selecting said public switched telephone network accessible numbers to be assigned from said group of available public switched telephone network accessible numbers.

24. A system as recited in claim 23, wherein said public switched telephone accessible number is returned to said group of available public switched telephone network accessible numbers after said public switched telephone accessible number is released.

25. A system as recited in claim 23, wherein there is a congestion alarm, and further comprising means for triggering said congestion alarm when no available public switched telephone network accessible numbers are available for use.

26. A system as recited in claim 22, wherein said mobile has a mobile identification number, and wherein said means for assigning to said mobile an intra foreign service exchange recognized number for addressing comprises means for associating said mobile identification number with said intra foreign service exchange recognized number.

27. A system as recited in claim 22, further comprising means for releasing said public switched telephone accessible number after a predetermined amount of time in which no call comes in.

28. A system as recited in claim 22, wherein there is at least one record for mobile identification storage, and wherein said means for detecting an incoming call to said mobile comprises means for seizing said at least one record for mobile identification storage.

* * * * *

UNITED STATES PATENT AND TRADEMARK OFFICE
CERTIFICATE OF CORRECTION

PATENT NO. : 5,353,340

DATED : October 4, 1994

INVENTOR(S) : Kunz, David P.

It is certified that error appears in the above-indentified patent and that said Letters Patent is hereby corrected as shown below:

| | |
|---|---|
| Column 3, line 52 | Replace "NSC" With --MSC-- |
| Column 4, line 38 | Replace "intraforeign" With --intra-foreign-- |
| Column 7-8, Table line 6 | Replace "suscriber" With --subscriber-- |
| Columns 7-8, Table line 13 | Replace "suscriber" With --subscriber-- |
| Columns 7-8, Table line 15 | Replace "suscriber" With --subscriber-- |
| Columns 7-8, Table line 16 | Replace "suscriber" With --subscriber-- |
| Columns 7-8, Table line 43 | Replace "suscriber" With --subscriber-- |

UNITED STATES PATENT AND TRADEMARK OFFICE
CERTIFICATE OF CORRECTION

PATENT NO. : 5,353,340
DATED : October 4, 1994
INVENTOR(S) : Kunz, David P.

It is certified that error appears in the above-indentified patent and that said Letters Patent is hereby corrected as shown below:

| | |
|---|---|
| Columns 7-8, Table line 44 | Replace "Suscriber" with --Subscriber-- |
| Column 11, line 57 | Replace "NRNUM" With --MRNUM-- |
| Column 12, line 54 | Replace "RRBN" With --RRNB-- |
| Column 27-28, Table label 50, line 8 | Replace "DATE" With --DATA-- |
| Column 36, line 43 | Replace "claimed" With --Claimed-- |
| Column 40, line 7 | Replace "is within said foregin" With --an infra foreign-- |

Signed and Sealed this

Seventh Day of May, 1996

Attest:

BRUCE LEHMAN

*Attesting Officer*    *Commissioner of Patents and Trademarks*